June 2, 1931.   M. T. LOTHROP   1,808,469
ROLLER BEARING REMOVING PROCESS
Filed Dec. 15, 1927

INVENTOR:
M. T. Lothrop
by Cann Ranet & Granby
HIS ATTORNEYS.

Patented June 2, 1931

1,808,469

UNITED STATES PATENT OFFICE

MARCUS T. LOTHROP, OF CANTON, OHIO, ASSIGNOR TO THE TIMKEN ROLLER BEARING COMPANY, OF CANTON, OHIO, A CORPORATION OF OHIO

ROLLER BEARING REMOVING PROCESS

Application filed December 15, 1927. Serial No. 240,139.

This invention relates to roller bearing axle constructions of the type wherein the end portion of the axle is encased in a housing and the roller bearing is interposed between said housing and said axle with its inner raceway member press-fitted on the axle. The principal object of the present invention is to provide an economical and practical process of removing the roller bearing and its housing from the axle; and also to provide an axle construction whose bearing is particularly adapted for removal according to said process. The invention consists in the process of removing the roller bearing from the axle; and it also consists in the construction, combinations and arrangements of parts hereinafter described and claimed.

Figure 1:
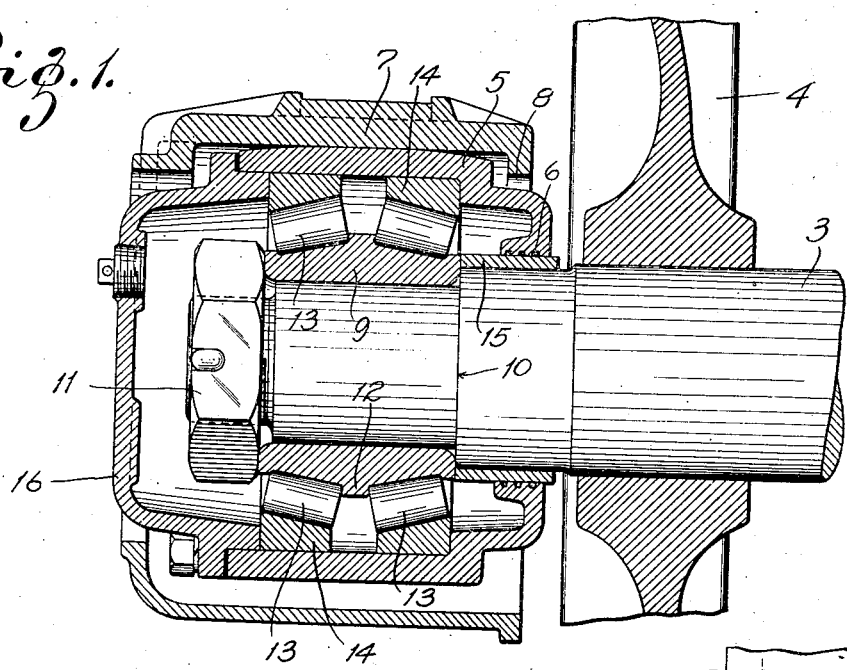
Figure 2:
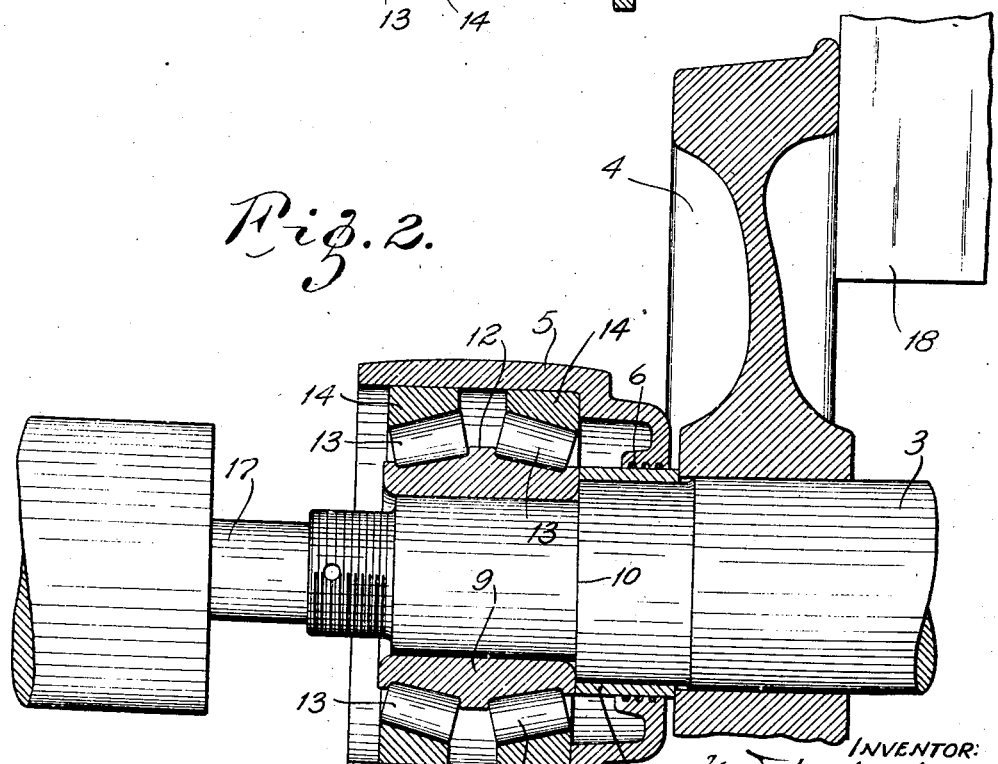

In the accompanying drawings, which form part of the specification and wherein like symbols refer to like parts wherever they occur, Fig. 1 is a longitudinal section through a roller bearing axle construction embodying my invention; and Fig. 2 is a similar section showing parts removed and the axle construction placed in a press with the ram thereof in engagement with the end of the axle.

The railway axle construction illustrated in the accompanying drawings comprises a solid axle 3, with a wheel 4 pressed thereon near its end with the portion of the axle located outwardly from said wheel extending into a cylindrical housing or casing 5 through a circular opening 6 in the inner wall thereof. The end portion of the axle 3 is rotatably supported in the housing 5 by means of conical roller bearings interposed between said axle and said housing; and the housing is enclosed in a suitable journal box 7, having an opening 8 in its inner end large enough to permit said journal box to be slipped on and off said housing. The housing 5 is fitted in the journal box in such manner as to be non-revolvable therein; and the upper portion of said housing is convexed endwise so as to permit the axle to rock up and down to take care of low joints in the track.

As shown in the drawings, the roller bearing comprises an inner raceway member 9 press-fitted on the axle between the end thereof and the wheel with its inner end bearing against a shoulder 10 on the axle and held in position by a nut 11 threaded on the end of the axle. The inner raceway member 9 has a circumferential rib 12 located about midway of its length and bearing surfaces that taper from said rib towards the respective ends of said inner raceway member. Co-operating with each bearing surface is a circular series of conical rollers 13 that cooperate with cups or outer raceway members 14 seated within the housing which encases the end portion of the axle. A cylindrical sleeve 15 is pressed on the axle between the hub of the wheel 4 and the bearing cone 9 with its outer end in abutting relation to the inner end of said cone. The bearing housing 5 serves as a reservoir for lubricant and has its outer end closed by a closure cap 16, which is bolted or otherwise removably secured to the housing and has an inwardly extending annular flange adapted to enter said housing and abut against the end of the outer cup or outer raceway members 14. The inner of the two cups 14 abuts against an annular shoulder formed in the inner wall of the housing; and the spacing sleeve 15 fits within the axle receiving opening in the inner end of said housing, which opening is provided with annular grooves which operate to prevent the escape of oil from and the entry of dust into said housing through said opening. As shown in the drawings the sleeve is made long enough to extend inwardly beyond the inner wall of the bearing housing when the outer end of the sleeve is in contact with the inner end of the inner raceway member of the roller bearing.

With the above arrangement, when it is desired to remove the roller bearing from the end of the axle 3, the journal box 7, the closure cap 16 and the nut 11 are removed from the end of the axle construction, and the axle construction is then placed in a suitable press with the outer end of the axle 3 in axial alinement with the ram 17 of the press and with the inner face of the wheel 4 abutting against a portion of the frame 18 thereof. The ram 17 is then forced against the outer end of the axle 3, and the axle, together with the cone and the cylindrical sleeve 15 thereon, is moved inwardly until the inner end of said sleeve abuts against the outer face of the wheel and thus prevents further inward sliding movement of the cone 9 and the sleeve. The pressure of the ram 17 against the outer end of the axle 3 is then continued and causes the axle 3 to be pushed through the inner raceway member 9 and the sleeve 15 which are held stationary by the wheel, thereby stripping the entire roller bearing, its housing 5 and the sleeve from the end of the axle. It is noted that the sleeve extends inwardly beyond the inner end of the bearing housing and thus prevents the wheel and bearing housing from coming in contact with each other during the operation of removing the bearing. If desired, the bearing and its housing may be removed from the axle 3 by holding the axle against movement while pressing the wheel outward thereon against the inner end of the spacer sleeve which pushes against the cone and thereby strips the bearing, its housing and the sleeve from the end of the axle.

What I claim is:

1. The process of removing a roller bearing and a wheel from a roller bearing railway axle construction wherein the end portion of the axle is enclosed within a housing having a removable closure cap at its outer end and an axle receiving opening at its inner end, said bearing being interposed between said axle and said housing with its inner raceway member press-fitted on said axle, which consists in providing said construction with a sleeve mounted on said axle in abutting relation to the inner end of said raceway member and extending through the axle receiving opening at the inner end of said housing, removing the closure cap from said housing, placing the rear face of the wheel against an abutment and then pressing axially against an end of said axle to force said end through said inner raceway member which abuts against said sleeve which in turn abuts against said wheel, thereby holding said inner raceway member, said sleeve and said wheel against movement with the axle.

2. The process of removing a roller bearing from a roller bearing axle construction wherein the end portion of said axle is enclosed within a housing having a removable closure cap at its outer end and an axle receiving opening at its inner end, said bearing being interposed between said axle and said housing with its inner raceway member press-fitted on said axle, a wheel being mounted on said axle adjacent to the inner end of said housing, which consists in providing said construction with a sleeve mounted on said axle in abutting relation to the inner end of said inner raceway member and extending inwardly beyond the inner face of said housing, removing the closure cap from said housing, and then causing relative endwise movement between said axle and said wheel by moving one of these members longitudinally while holding the other member against such movement, whereby the pressure on one member is transmitted through said sleeve to the other member without the wheel and the housing coming in contact with each other.

Signed at Canton, Ohio, this 29 day of Nov., 1927.

MARCUS T. LOTHROP.